US011317595B2

(12) United States Patent
Persson

(10) Patent No.: US 11,317,595 B2
(45) Date of Patent: May 3, 2022

(54) METHODS AND APPARATUSES FOR PROVIDING A REFERENCE VALUE TO BE USED FOR CONTROLLING THE CALIBRATION OF A MILK METER

(71) Applicant: DELAVAL HOLDING AB, Tumba (SE)

(72) Inventor: Per Persson, Tumba (SE)

(73) Assignee: DeLaval Holding AB, Tumba (SE)

( * ) Notice: Subject to any disclaimer, the term of this patent is extended or adjusted under 35 U.S.C. 154(b) by 87 days.

(21) Appl. No.: 16/980,470

(22) PCT Filed: Apr. 9, 2019

(86) PCT No.: PCT/SE2019/050330
§ 371 (c)(1),
(2) Date: Sep. 14, 2020

(87) PCT Pub. No.: WO2019/199223
PCT Pub. Date: Oct. 17, 2019

(65) Prior Publication Data
US 2021/0022310 A1    Jan. 28, 2021

(30) Foreign Application Priority Data
Apr. 13, 2018    (SE) .................................. 1850426-6

(51) Int. Cl.
*A01J 5/01*    (2006.01)
(52) U.S. Cl.
CPC ...................................... *A01J 5/01* (2013.01)
(58) Field of Classification Search
CPC ....................................................... A01J 5/01
See application file for complete search history.

(56) References Cited

U.S. PATENT DOCUMENTS

| 5,116,119 | A | 5/1992 | Brayer | |
|---|---|---|---|---|
| 2006/0137615 | A1* | 6/2006 | Umegard | .................. A01J 5/01 119/14.18 |
| 2007/0272159 | A1 | 11/2007 | Francke et al. | |

FOREIGN PATENT DOCUMENTS

| EP | 1 545 191 | 6/2005 |
|---|---|---|
| EP | 1 545 191 | 10/2017 |

(Continued)

OTHER PUBLICATIONS

"Section 11—Milk Recording Devices", Section 11—Guidelines for Testing, Approval and Checking of Milk Recording Devices, The Global Standard for Livestock Data, ICAR Guidelines, Section 11, retrieved Nov. 5, 2018, 46 pages, https://www.icar.org/index.php/icar-recording-guidelines/.

(Continued)

*Primary Examiner* — Magdalena Topolski
*Assistant Examiner* — Edgar Reyes
(74) *Attorney, Agent, or Firm* — Nixon & Vanderhye

(57) ABSTRACT

This disclosure generally relates milking systems and, in particular, automatic milking systems. The disclosure presents methods, apparatuses and computer program for providing a reference value to be used for controlling a calibration of at least one milk meter in a milking system. In accordance with one embodiment, a method may comprise obtaining (510) milk flow data for a plurality of milking animals to determine a milk flow profile for each milking animal of the plurality of milking animals; comparing (520) the determined milk flow profiles to establish a subset of milk flow profiles that meets a pre-defined selection criteria; determining (530) said reference value based on the established subset of milk flow profiles; and providing (540) the determined reference value for controlling a subsequent calibration of at least one milk meter in a milking system.

20 Claims, 6 Drawing Sheets

(56) References Cited

FOREIGN PATENT DOCUMENTS

| GB | 2472503 | 2/2011 |
|---|---|---|
| WO | 02/052927 | 7/2002 |
| WO | 02/100164 | 12/2002 |
| WO | 2004/028242 | 4/2004 |
| WO | 2007/015226 | 2/2007 |

OTHER PUBLICATIONS

Search Report for SE Patent Application No. 1850426-6 dated Apr. 13, 2018, 2 pages.
International Search Report for PCT/SE2019/050330 dated Jul. 25, 2019, 4 pages.
Written Opinion of the ISA for PCT/SE2019/050330 dated Jul. 25, 2019, 5 pages.

* cited by examiner

METHODS AND APPARATUSES FOR PROVIDING A REFERENCE VALUE TO BE USED FOR CONTROLLING THE CALIBRATION OF A MILK METER

This application is the U.S. national phase of International Application No. PCT/SE2019/050330 filed Apr. 9, 2019 which designated the U.S. and claims priority to SE Patent Application No. 1850426-6 filed Apr. 13, 2018, the entire contents of each of which are hereby incorporated by reference.

TECHNICAL FIELD

The present disclosure generally relates to milking systems, preferably automatic milking systems.

More specifically, the present disclosure presents methods, apparatuses and computer program for providing a reference value to be used for controlling a calibration of one or more milk meters in a milking system.

BACKGROUND

In a milking system, several milk meters are commonly used to measure the amount of milk produced by the milking animals (e.g., cows) in a herd. Each milking animal may be milked utilizing one or more of these milk meters depending on the milking occasion. One example of a milk meter that can be used for measuring the amount of milk produced by the milking animals is disclosed in the U.S. Pat. No. 5,116,119.

Furthermore, and as is known in the existing art, milk meters are generally calibrated, e.g. on a routine basis, to ensure that each one of the milk meters measures a correct amount of the milk produced.

The European Patent No. EP 1 545 191 discloses methods and techniques for the calibration of one or more milk meters in a milking system. As is described in this European patent, the calibration process typically requires access to a reference value which is subsequently used to control the calibration process.

SUMMARY

It is in view of the above considerations and others that the various aspects and embodiments disclosed herein have been made.

Despite the advances in milking system technology, the calibration of milk meters may still be inadequate in some situations.

In view of the above, it is therefore a general object of the aspects and embodiments described throughout this disclosure to provide a solution, which enables a quality improvement of the calibration of milk meter(s) in a milking system.

The present disclosure is based on the recognition that the provision of improved reference values can increase the quality of the subsequent calibration of the milk meter(s) in the milking system.

The above-identified general object has been addressed by the appended independent claims. Advantageous embodiments are defined in the appended dependent claims.

According to a first aspect, this disclosure presents a method for providing a reference value to be used for controlling a calibration of at least one milk meter in a milking system, such as an automatic milking system. The method comprises obtaining milk flow data for a plurality of milking animals to determine a milk flow profile for each milking animal of the plurality of milking animals, comparing the determined milk flow profiles to establish a subset of milk flow profiles that meets a pre-defined selection criteria, determining said reference value based on the established subset of milk flow profiles and providing the determined reference value for controlling a subsequent calibration of at least one milk meter in a milking system.

In an advantageous embodiment, the pre-defined selection criteria may include a target milk flow profile. The target milk flow profile may reflect a milking animal having a milk flow above a pre-defined threshold value during a pre-defined duration.

In one example embodiment, said pre-defined duration may advantageously correspond to a pre-defined phase of the target milk flow profile. The pre-defined phase may be i) an increase phase, ii) a plateau phase, or iii) a decline phase. Alternatively, the pre-defined phase may include a combination of two or three of said phases i), ii) and iii).

As will be appreciated, target milk flow profiles can be on either udder level or on quarter level. In an exemplary quarter level embodiment, the earlier-mentioned pre-defined threshold value may be at least one kilogram per minute. Additionally, or alternatively, the earlier-mentioned pre-defined duration may be at least two minutes.

In an exemplary udder level embodiment, the earlier-mentioned pre-defined threshold value may be at least four kilograms per minute (e.g., 4.0, 4.25, 4.5, 4.75, 5.0, 5.25, 5.5, 5.75, or 6.0 kilograms per minute). Additionally, or alternatively, the earlier-mentioned pre-defined duration may be at least two minutes.

In some embodiments, obtaining milk flow data for a plurality of milking animals may comprise recording milk flow characteristics for each milking animal of the plurality of milking animals and generating milk flow data based on the recorded milk flow characteristics.

In preferred embodiments, the determined reference value may be subsequently utilized in a calibration of at least one milk meter in a milking system. For example, the method may additionally comprise accessing the determined reference value and performing a calibration of at least one milk meter by utilizing the accessed reference value.

The above-mentioned milking system may comprise least one milking station accessible by the plurality of milking animals and at least one milk meter that is configured to measure at least one value of a parameter that corresponds to a milk flow of a milking animal.

According to a second aspect, this disclosure presents an apparatus for providing a reference value to be used for controlling a calibration of at least one milk meter in a milking system. The apparatus comprises means adapted to obtain milk flow data for a plurality of milking animals to determine a milk flow profile for each milking animal of the plurality of milking animals, means adapted to compare the determined milk flow profiles to establish a subset of milk flow profiles that meets a pre-defined selection criteria, means adapted to determine said reference value based on the established subset of milk flow profiles, and means adapted to provide the determined reference value for controlling a subsequent calibration of at least one milk meter in a milking system.

In an advantageous embodiment, the pre-defined selection criteria may include a target milk flow profile. The target milk flow profile may reflect a milking animal having a milk flow above a pre-defined threshold value during a pre-defined duration.

In one example embodiment, said pre-defined duration may advantageously correspond to a pre-defined phase of the target milk flow profile. The pre-defined phase may be i) an increase phase, ii) a plateau phase, or iii) a decline phase. Alternatively, the pre-defined phase may include a combination of two or three of said phases i), ii) and iii).

As described earlier herein, target milk flow profiles can be on either udder level or on quarter level.

In an exemplary quarter level embodiment, the earlier-mentioned pre-defined threshold value may be at least one kilogram per minute. Additionally, or alternatively, the earlier-mentioned pre-defined duration may be at least two minutes.

In an exemplary udder level embodiment, the earlier-mentioned pre-defined threshold value may be at least four kilograms per minute (e.g., 4.0, 4.25, 4.5, 4.75, 5.0, 5.25, 5.5, 5.75, or 6.0 kilograms per minute). Additionally, or alternatively, the earlier-mentioned pre-defined duration may be at least two minutes.

In some embodiments, the apparatus may comprise means adapted to record milk flow characteristics for each milking animal of the plurality of milking animals. The apparatus may also comprise means adapted to generate milk flow data based on the recorded milk flow characteristics.

In some embodiments, the apparatus may be adapted to (subsequently) utilize the determined reference value in a calibration of at least one milk meter in a milking system. For example, the apparatus may additionally comprise means adapted to access the determined reference value; and means adapted to perform a calibration of at least one milk meter by utilizing the accessed reference value.

The milking system may be a milking system that comprises at least one milking station accessible by the plurality of milking animals and at least one milk meter that is configured to measure at least one value of a parameter that corresponds to a milk flow of a milking animal.

In some implementations, an apparatus for providing a reference value to be used for controlling a calibration of at least one milk meter in a milking system is thus provided. For example, the apparatus may comprise at least one processor and at least one memory. The at least one memory may comprise instructions executable by the at least one processor whereby the apparatus is operative to obtain milk flow data for a plurality of milking animals to determine a milk flow profile for each milking animal of the plurality of milking animals, to compare the determined milk flow profiles to establish a subset of milk flow profiles that meets a pre-defined selection criteria, to determine said reference value based on the established subset of milk flow profiles, and to provide the determined reference value for controlling a subsequent calibration of at least one milk meter in a milking system.

In an advantageous implementation, pre-defined selection criteria may include a target milk flow profile. The target milk flow profile may reflect a milking animal having a milk flow above a pre-defined threshold value during a pre-defined duration.

In one example embodiment, said pre-defined duration may advantageously correspond to a pre-defined phase of the target milk flow profile. The pre-defined phase may be i) an increase phase, ii) a plateau phase, or iii) a decline phase. Alternatively, the pre-defined phase may include a combination of two or three of said phases i), ii) and iii).

As described earlier herein, target milk flow profiles can be on either udder level or on quarter level.

In an exemplary quarter level embodiment, the earlier-mentioned pre-defined threshold value may be at least one kilogram per minute. Additionally, or alternatively, the earlier-mentioned pre-defined duration may be at least two minutes.

In an exemplary udder level embodiment, the earlier-mentioned pre-defined threshold value may be at least four kilograms per minute (e.g., 4.0, 4.25, 4.5, 4.75, 5.0, 5.25, 5.5, 5.75, or 6.0 kilograms per minute). Additionally, or alternatively, the earlier-mentioned pre-defined duration may be at least two minutes.

In some implementations, the at least one memory may further comprise instructions executable by the at least one processor whereby the apparatus is operative to record milk flow characteristics for each milking animal of the plurality of milking animals and to generate milk flow data based on the recorded milk flow characteristics.

Furthermore, in some implementations, the apparatus may be further configured to perform a calibration of at least one milk meter in a milking system. Moreover, the determined reference value may be (subsequently) utilized in this calibration. For example, the at least one memory may further comprise instructions executable by the at least one processor whereby the apparatus is operative to access the determined reference value and to perform a calibration of at least one milk meter by utilizing the accessed reference value.

In some implementations, the milking system may advantageously comprise at least one milking station accessible by the plurality of milking animals and at least one milk meter that is configured to measure at least one value of a parameter that corresponds to a milk flow of a milking animal.

According to a third aspect, this disclosure presents computer program, comprising instructions which, when executed on at least one processor, cause the at least one processor to carry out the method according to the earlier-described first aspect. A carrier comprising the computer program according the third aspect may also optionally be provided. The carrier may, e.g., be an electronic signal, an optical signal, a radio signal or a computer-readable storage medium.

Various aspects and embodiments described herein enable the provision of improved reference values that can be used in subsequent calibrations of milk meter(s) of a milking system, such as an automatic milking system.

Aspects and embodiments presented herein are based on the realization that a proper subset of milk flow profiles can be used when determining the reference value. By performing the determination of the reference value on the basis of this subset of milk flow profiles it is made possible to optimize, or at least improve, the reference value.

As a consequence, any subsequent calibration can benefit from the optimized, or at least improved, reference value when milk meter(s) of the milking system are calibrated. Various aspects and embodiments described herein therefore allow for improved calibrations of milk meter(s) of a milking system. While the various aspects and embodiments are not directed towards the calibration per se, this disclosure proposes a way of providing reference value(s) to be used in the calibration of milk meter(s) with improved accuracy and/or increased reliability.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein. Rather, these embodiments are provided by way of example so that this disclosure will be thorough and complete, and will fully convey the scope of the invention to those persons skilled in the art. Like reference numbers refer to like elements or method steps throughout the description.

Figure 1:
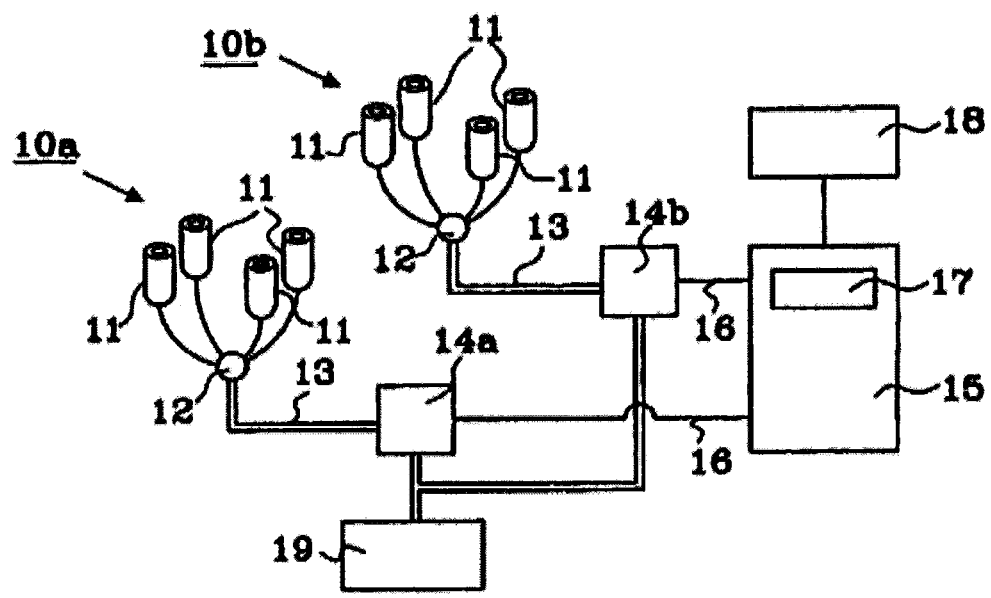
FIG. 1 schematically illustrates a first embodiment of a milking system where aspects and embodiments of the invention may be applied.

Reference is now made to the figures, where FIG. 1 illustrates an example environment where aspects and embodiments of the present invention may be applied. In this example embodiment, two milking stations 10a, 10b are provided. Each milking station 10a, 10b may be placed within some type of milking parlour and may also comprise four teat cups 11. The teat cups 11 may be attached to respective teats of a milking animal (e.g., a cow) during a milking operation. The milk from all teat cups 11 may pass a collector 12, e.g. a claw, and may further be transported via line 13 to milk meters 14a and 14b, respectively. As is appreciated, several milk meters 14a, 14b may be used for measuring the milking performance in each milking station. In this example, one milk meter is used for each milking station 10a and 10b, respectively.

The milk meters 14a and 14b may be separately and independently connected to a processor 15, or controller, via a communication line. Each milk meter 14a, 14b may further be configured to measure at least one value of a parameter that corresponds to a milk flow of a milking animal. In other words, each milk meter is configured to measure a milking performance of the milking animal in question, e.g. milk flow over time, the total weight or volume of the milk, etcetera. Said at least one value may be recorded, or otherwise registered, in a memory 17 which may include a database (not shown).

Furthermore, the processor 15 may be configured to generate, or otherwise calculate, an expected milking performance value. This expected milking performance value may be used to determine whether a certain milk meter is in need of a calibration. It is also possible that a user interface, e.g. including a touch-screen based display 18, is communicatively connected to the processor to provide a user or operator with means for interfacing with the milking system (e.g., receiving information or data therefrom and/or providing commands thereto).

When the milk has passed each milk meter 14a and 14b, the milk may be transported to a receiver 19. The receiver 19 may be a common receiver. That is, the receiver 19 is common for all milk meters in the milking system.

Figure 2:
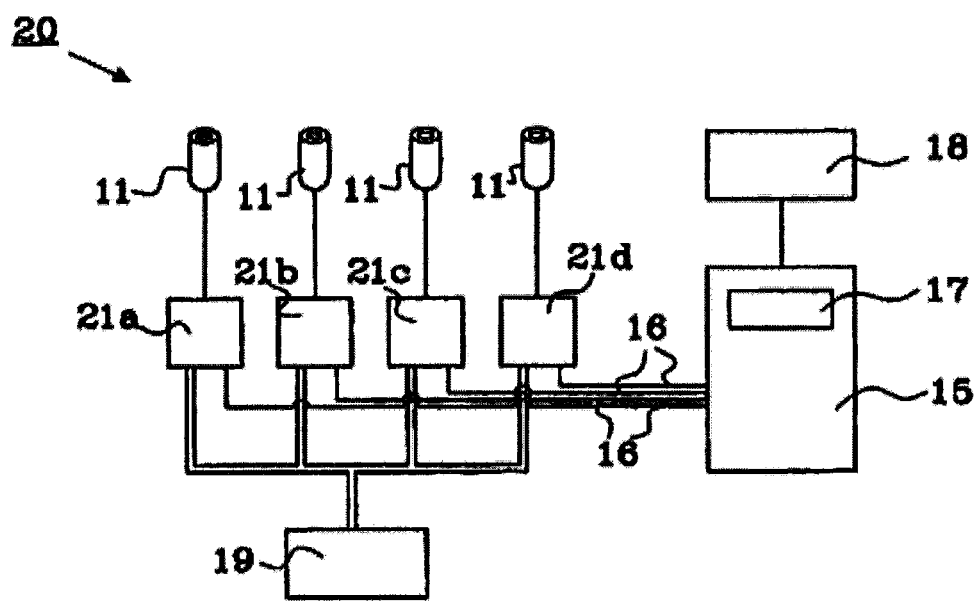
FIG. 2 schematically illustrates a second embodiment of a milking system where aspects and embodiments of the invention may be applied.

Reference is now made to FIG. 2, which illustrates another example environment where embodiments of the present invention may be applied. In this example embodiment, only one milking station 20 is provided. The milking station may preferably, but not necessarily, be placed in an automatic milking system which suitably uses a robot.

The milking station 20 may comprise four teat cups 11, which may be attached to respective teats of the milking animal during a milking operation. The teat cups may further be attached to, or otherwise connected to, respective milk meters 21a, 21b, 21c and 21d.

The milk meters 21a, 21b, 21c and 21d may be separately and independently connected to a processor 15, or controller, via a communication line. Each milk meter 21a, 21b, 21c and 21d may further be configured to measure at least one value of a parameter that corresponds to a milk flow of a milking animal. In other words, each milk meter is configured to measure a milking performance of the milking animal in question, e.g. milk flow over time, the total weight or volume of the milk, etcetera. Said at least one value may be recorded, or otherwise registered, in a memory 17 which may include a database (now shown).

Furthermore, the processor 15 may be configured to generate, or otherwise calculate, an expected milking performance value. This expected milking performance value may be used to determine whether a certain milk meter is in need of a calibration. It is also possible that a user interface, e.g. including a touch-screen based display 18, is communicatively connected to the processor to provide a user or operator with means for interfacing with the milking system (e.g., receiving information or data therefrom and/or providing commands thereto).

When the milk has passed each milk meter 14a and 14b, the milk may be transported to a receiver 19. The receiver 19 may be a common receiver. That is, the receiver 19 is common for all milk meters in the milking system.

Figure 3:
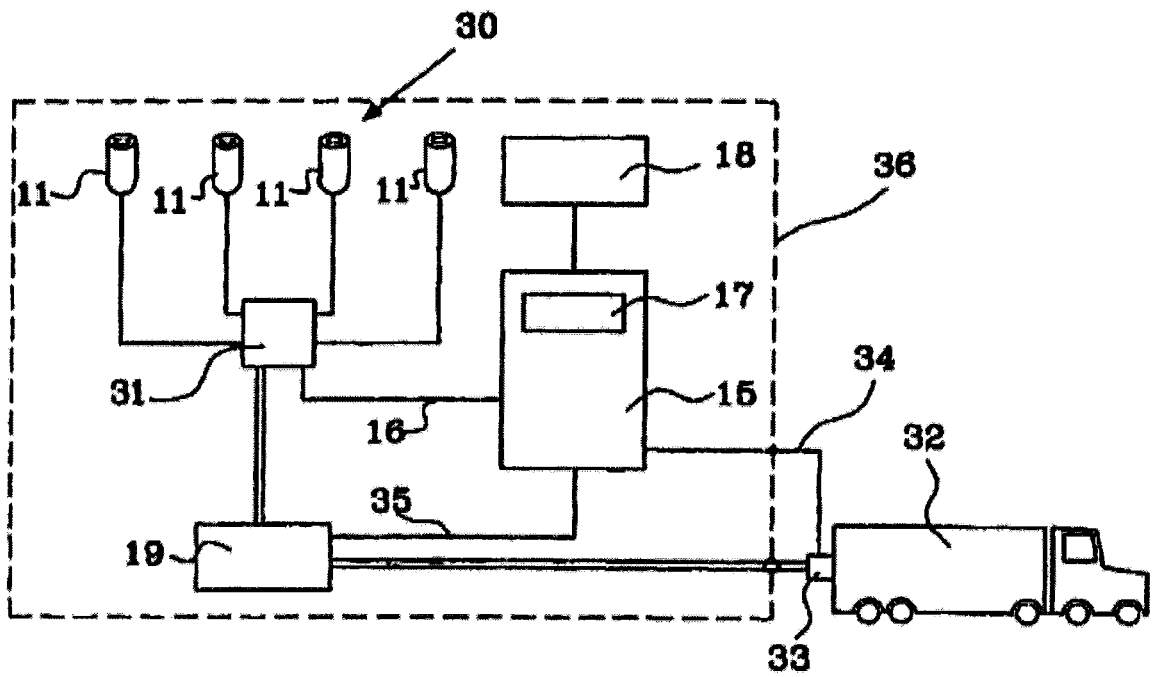
FIG. 3 schematically illustrates a second embodiment of a milking system where aspects and embodiments of the invention may be applied.

FIG. 3 schematically illustrates still another example environment where embodiments of the present invention may be applied. In this example embodiment, there is one milking station 30 having four teat cups 11. The teat cups 11 may be attached to the respective teats of the milking animal during a milking operations. The teat cups 11 may be attached or otherwise connected to a common milk meter 31. That is, the milk meter 31 may be common to all four teat cups 11.

The milk meter 31 may be communicatively connected to a processor 15, or controller, via a communication line 16. The milk meter 31 may be configured to measure the milking performance of the teats of the milking animal, in a same or similar manner as previously described in connection with FIGS. 1 and/or 2. Again, the processor 15 may be configured to generate, or otherwise calculate, an expected milking performance value. This expected milking performance value may be used to determine whether a certain milk meter is in need of a calibration. It is also possible that a user interface, e.g. including a touch-screen based display 18, is communicatively connected to the processor to provide a user or operator with means for interfacing with the milking system (e.g., receiving information or data therefrom and/or providing commands thereto).

When the milk has passed the milk meter 31, the milk may be transported to a receiver 19. The receiver 19 may have a sensor that is configured to measure the amount of milk in the receiver 19. The sensor, if present, may also be communicatively connected to the processor 15 via a communication line 35. When a milk truck 32 arrives to the milking system 36, as indicated by dashed lines in FIG. 3, to transport the milk in the receiver 19 to a dairy plant, the tank of the truck 32 may be connected to the receiver 19 via another milk meter 33. This milk meter 33 may be carried by the milk truck 32 and be attached to the inlet of the tank. A purpose of this milk meter 33 is to measure the amount of milk collected from the milk system 36, i.e. the amount of milk in the receiver 19. This milk meter may be calibrated often, and should therefore also show an as accurate value as possible. The measured amount of the milk meter 33 may be fed back to the processor 15 via communication line 34, but it is also possible to manually feed this information into the processor 15, e.g. via a user interface 18.

Figure 4:
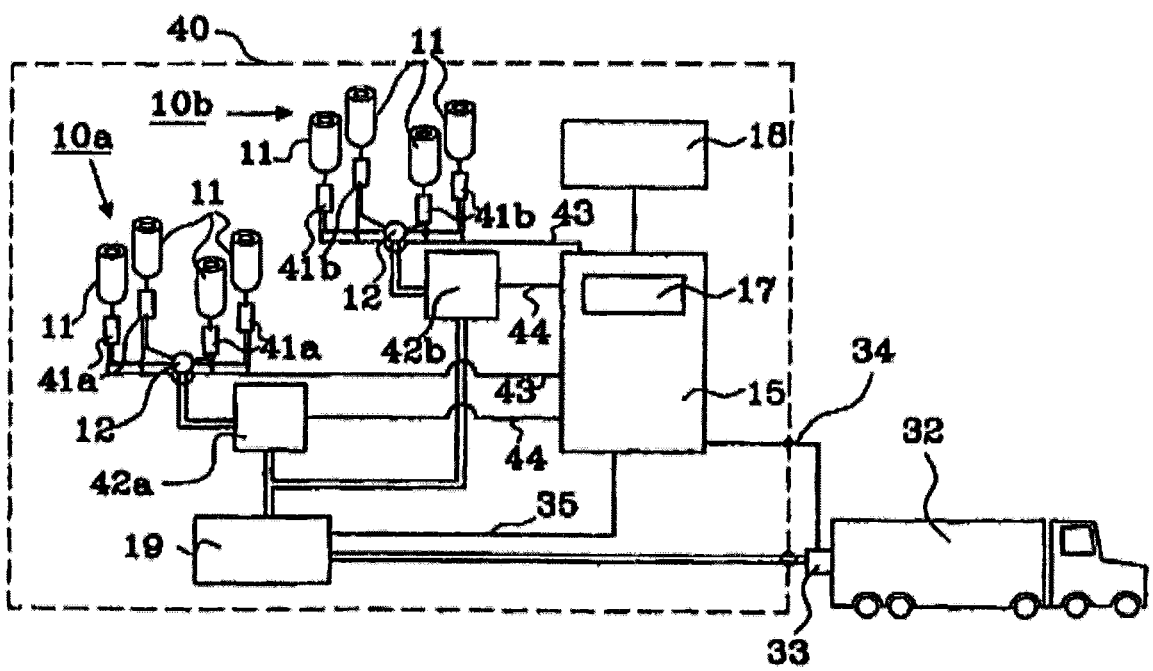
FIG. 4 schematically illustrates a second embodiment of a milking system where aspects and embodiments of the invention may be applied.

FIG. 4 schematically illustrates yet another example environment where embodiments of the present invention may be applied. In this example embodiment, there are two milking stations 10a and 10b, respectively. Each milking station 10a, 10b may be placed in some type of milking parlour and each milking station 10a and 10b, respectively, may comprise four teat cups 11. Each one of the four teat cups 11 may be configured to be attached to respective teats of the milking animal during milking operations. The teat cups 11 of each milking station 10a, 10b may be connected to a first milk meter 41a and 41b. The milk from each first milk meter may thereafter be transported to intermediate milk meters 42a and 42b respectively, via a collector 12, which preferably contains the whole volume of the milk received from the udder.

The milk meters 41a, 41b, 42a and 42b may be provided with means to measure a value corresponding to the milk performance. Furthermore, the first milk meters may advantageously measure the milk flow and the intermediate milk meters may advantageously measure the weight of the milk collected from the milking animal. The first milk meters 41a, 41b may be separately and independently connected to a processor 15 via a communication line 43 and the intermediate milk meters 42a, 42b may be separately connected to the processor 15 via a communication line 44. Values from all milk meters corresponding to the milking performance of the animal in question may be recorded or otherwise registered in a memory 17, for example including a database.

The processor 15 may further comprise means to generate or otherwise calculate an expected milking performance value. The expected performance value may be used to determine if a milk meter is in need of a calibration. A user interface 18 may also be communicatively connected to the processor 15, as described previously in conjunction with FIGS. 1, 2 and/or 3.

When the milk has been collected in the intermediate milk meter 42a, 42b, and the amount of milk has been measured, the milk may be transported to a common receiver 19, which in this embodiment has a sensor (not shown) that is configured to measure a total amount of milk from all present milking stations 10a, 10b. The sensor may also be connected to the processor 15 via a communication line 35. When a milk truck 32 arrives at the milking system 40, indicated by the dashed line in FIG. 4, to transport the milk in the receiver 19 to a dairy plant, the tank of the truck 32 may be connected to the receiver 19 via another milk meter 33. This latter milk meter 33 may be carried by the milk truck 32 and may also be attached to the inlet of the tank. A purpose of this latter milk meter 33 is to measure the amount of milk collected from the milk system 40, i.e. the amount of milk in the receiver 19. This milk meter 33 is typically calibrated often, and should therefore also show an as accurate value as possible. The measured amount of the milk meter 33 may advantageously be fed back to the processor 15 via communication line 34. Alternatively, or additionally, it may be possible to manually feed this information into the processor 15 by operating the user interface 18.

The milk meters in the above described various types of milking systems may be monitored using a method according to the disclosure of the European Patent No. EP 1 545 191. To this end, it may be important that the system comprises means to calculate an expected milking performance value at a given time for each animal in the system according to FIGS. 1, 3 and 4, and for each teat in the system according to FIG. 2, if the system should be able to monitor and individually recalibrate a milk meter that has an error in measurement. The expected performance value may be calculated in a number of ways, one of which is disclosed in an article with the title "A method for continuous automatic monitoring of accuracy of milk recording equipment" by G. Wendl, X Zenger and H. Auernhammer, published in EAAP Publication No. 65, 1992, pages 338 to 345.

The disclosure of EP 1 545 191 is incorporated herein in its entirety to give context to the aspects and embodiments of the present invention. As described in EP 1 545 191 (cf. paragraph [0050] of the publication EP 1 545 191 B2), it is important to access a reference value which is then used to control the calibration process.

As described earlier herein and despite the advances in milking system technology, some existing solutions for calibrating milk meters in milking systems may be inadequate. Therefore, there exist a need for further improving upon the existing art in and enable a calibration process with even higher or better accuracy and/or reliability.

In the following, various aspects and embodiments of the present invention will be described in more detail. To address the above-mentioned need, and in accordance with an aspect, the present disclosure proposes a method for providing a reference value to be used for controlling a calibration of at least one milk meter in a milking system as is schematically illustrated in a flow chart in FIG. 5.

Action 510: Milk flow data is obtained for a plurality of milking animals (e.g., cows). Based on the milk flow data, milk flow profiles are determined for each milking animal of the plurality of milking animals.

In some embodiments, milk flow characteristics may be recorded 511 for each milking animal. This may e.g. be performed in real-time, i.e. while a milking animal is being milked in the milking system. Furthermore, milk flow data may be generated 512, or otherwise produced, on the basis of the thus recorded milk flow characteristics.

Various milk flow profiles may of course be determined depending on the requirements of the milking system or other demands. In advantageous embodiments, milk flow rate profiles are determined based on the obtained milk flow data. A milk flow rate profile typically reflects the milk flow rate characteristics of the milking animal. As will be appreciated, milk flow profiles can be on either udder level or on quarter level. In some applications, it may be desirable to obtain udder milk flow profiles based on udder milk flow data whereas, in other applications, it may be preferred to obtain quarter milk flow profiles based on quarter milk flow data.

Figure 6:
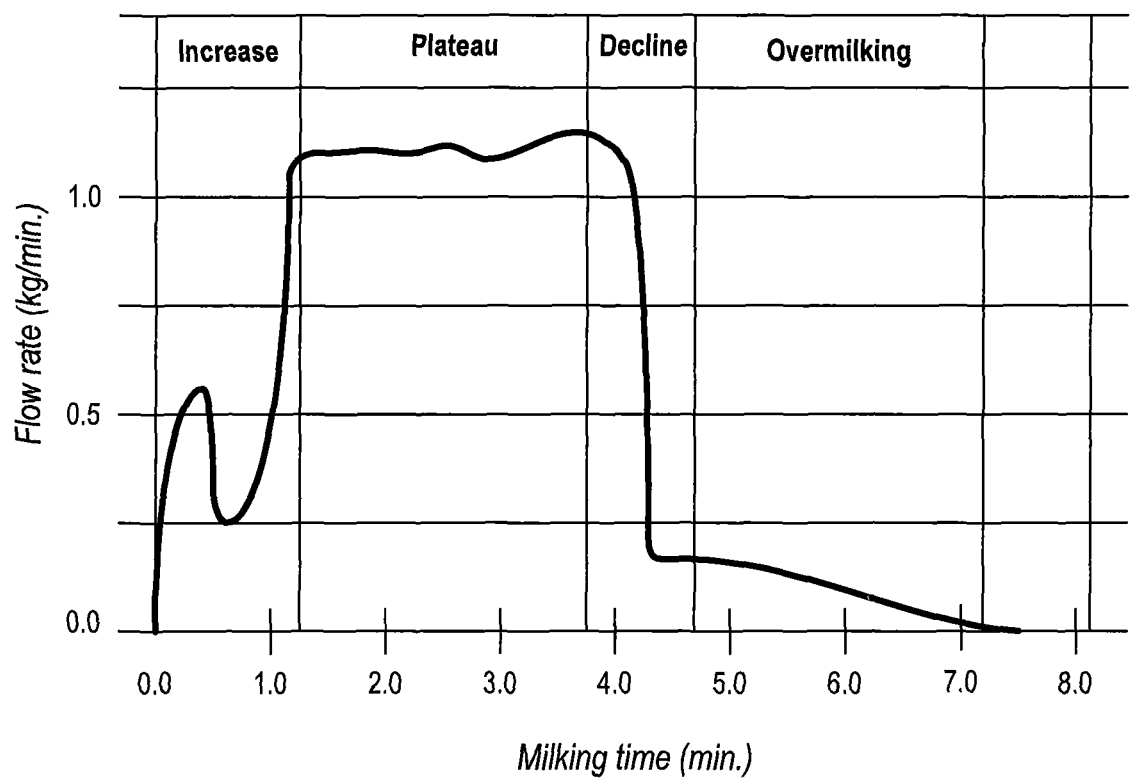
FIG. 6 is a schematic illustration of an example milk flow rate profile.

FIG. 6 schematically illustrates an example of a milk flow rate profile at quarter level. A milk flow rate profile, as shown in FIG. 6, typically has certain characteristics as schematically illustrated in FIG. 6 and as is known in the existing art. The flow rate characteristics may be divided into four different phases, namely 1) "increase", 2) "plateau", 3) "decline" and 4) "overmilking". In the following discussion, embodiments of the present invention will be discussed using a milk flow rate profile having characteristics as illustrated in FIG. 6. This is done in order to ease the understanding of the various aspects and embodiments of the present invention, but should not be understood as restricting the scope of the appended claims. While this is an example at quarter level, it should again be emphasized that milk flow rate profiles at udder level could equally possibly be used when reducing the present invention into practice.

Action 520: The determined milk flow profiles are compared. Based on the compared milk flow profiles, a subset of milk flow profiles that meets a pre-defined selection criteria is established. In advantageous embodiments, the pre-defined selection criteria includes a target milk flow profile. A target milk flow profile is a milk flow profile having certain, e.g. pre-defined, characteristics. For example, the target milk flow profile may be a target milk flow rate profile. With continued reference to FIG. 6, a target milk flow rate profile may be a milk flow rate profile having certain, e.g. pre-defined, characteristics of one or more of the different phases: namely 1) "increase", 2) "plateau", 3) "decline" and 4) "overmilking". For example, the target milk flow profile may thus reflect a milking animal having a milk flow meeting certain characteristics during a pre-defined duration. As can be seen in FIG. 6, the "increase" phase involves a substantial increase of the milk flow rate during a relatively short period of time. In a similar manner, the "decline" phase involves a substantial decrease of milk flow rate during a relatively short period of time. In contrast, the "plateau" phase involves a relatively even and relatively high milk flow rate for a longer period of time, typically (but not necessarily) longer than 2 or approximately 2 minutes. Finally, the "overmilking" phase generally involves a relatively slow planning out of the milk flow rate over a longer period of time, such as 1 or 2 minutes or longer.

Different criteria for the target milk flow profile may be used in order to establish the subset of milk flow profiles. For example, the present disclosure recognizes the fact that some milk meters generally provides best performance at advantageous milk flows (e.g., high milk flows during certain phases of the milking operation). Therefore, and in accordance with certain embodiments herein, the present disclosure also recognizes the fact that it may be advantageous to utilize criteria associated with the plateau phase of a target milk flow rate profile (cf. FIG. 6). For example, said pre-defined threshold value may therefore be at least 1 kilogram per minute. Additionally, said pre-defined duration may be at least two minutes. As will be appreciated, and in accordance with this example embodiment, milk flow rate profiles meeting these criteria (i.e., >1 kg/min for 2 minutes or longer) would be selected, or otherwise determined, to represent or form the subset of milk profiles.

The present disclosure thus also recognizes the fact that, based on earlier research of e.g. milk flow rate profiles, it is possible to evaluate and test the above-mentioned criteria such that only milking animals with a certain milk flow rate profile (e.g., milking animals with a high yield in terms of a high milk flow rate during the "plateau" phase) represent or form said subset of milking animals.

Action 530: A reference value is determined. The reference value is typically determined on the basis of the established subset of milk flow profiles. In other words, the earlier-established subset of milking animals, whose milk flow profiles meet the pre-defined selection criteria (e.g., a target milk flow rate profile) are used as a basis for determining the reference value.

The reference value may be any suitable reference value that can be utilized in a subsequent calibration process of milk meter(s). It is not essential for reducing the aspects and embodiments of present invention into practice which reference value this is. It could e.g. be a reference value as described in the European Patent No. EP 1 545 191, i.e. a reference value, RV, reflecting the amount of milk received from a number of milking animals during a selected period in a reference unit (see e.g. paragraph [0052] in EP 1 545 191 B2). What is important in accordance with the aspects and embodiments of the present invention is the fact that the reference value is determined only on basis of certain milking animals, i.e. the subset of milking animals meeting the pre-defined selection criteria. For example, basing the determination of the reference value from a smaller population (i.e., the subset) of milking animals that meets certain milk flow rate criteria may allow for improved accuracy and/or reliability in the reference values to be used in the subsequent calibration of milk meter(s).

Action 540: The determined reference value is provided for controlling a subsequent calibration of at least one milk meter, i.e. one or several milk meters, in the milking system. The determined reference value may therefore be subsequently utilized in a calibration of the at least one milk meter in a milking system.

Figure 5:
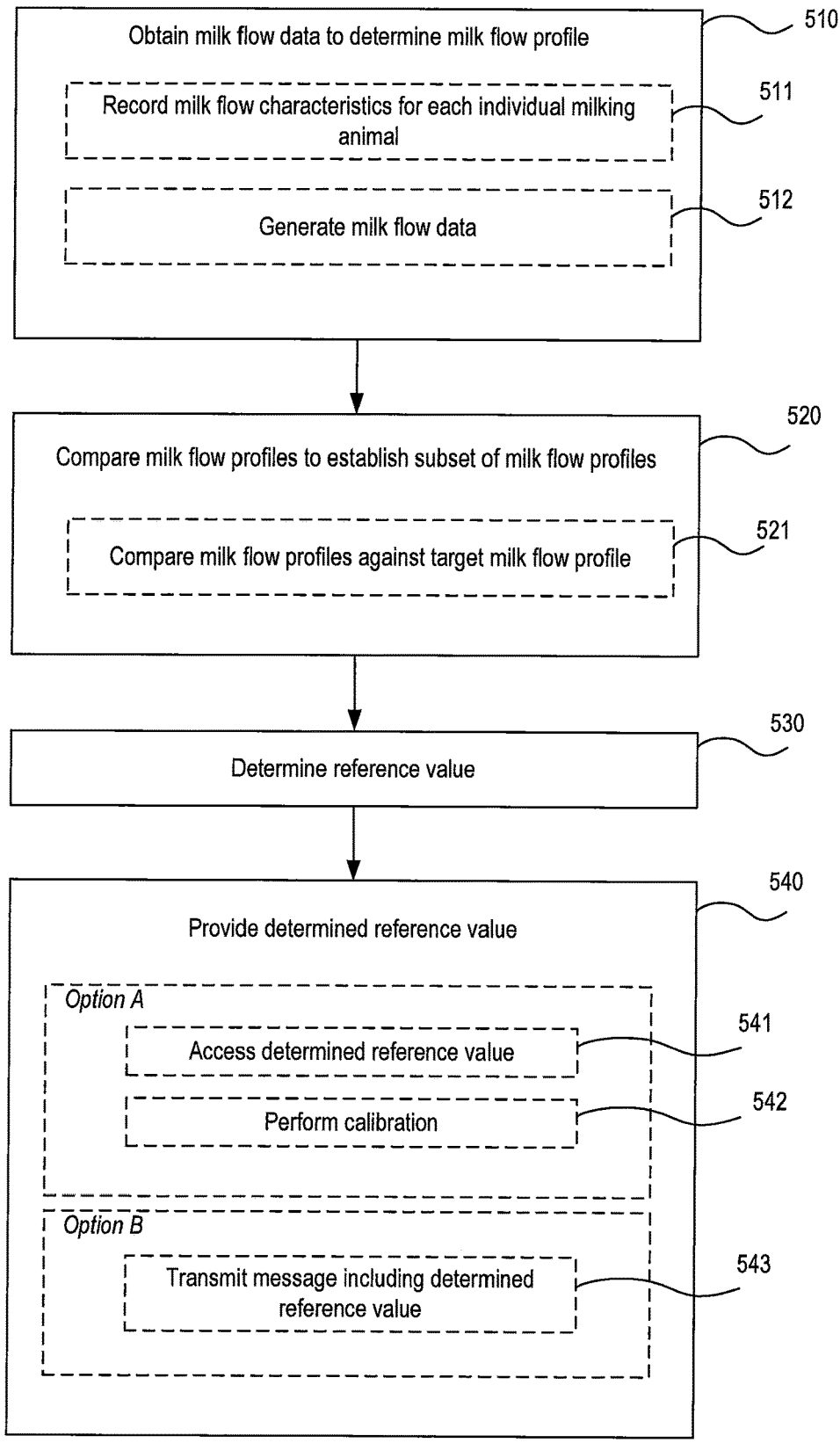
FIG. 5 schematically illustrates a flow chart of a method.

In some embodiments, which are illustrated as option A in FIG. 5, the method 500 comprises accessing 541 the determined reference value. Furthermore, the method may comprise performing 542 a calibration of at least one milk meter by utilizing the accessed reference value. In other words, the provision of the reference value as well as the subsequent calibration utilizing the thus provided reference value may be performed by, or otherwise executed in, one single apparatus (not shown).

In alternative embodiments, which are illustrated as option B in FIG. 5, the method comprises transmitting 543, i.e. sending, a data message that includes or otherwise indicates the determined reference value to an apparatus. In other words, the provision of the reference value may be performed by, or otherwise executed in, one apparatus and the subsequent calibration utilizing reference value may be performed by, or otherwise executed in, another different apparatus. In other words, a distributed solution utilizing multiple apparatuses is conceivable.

The calibration process itself for calibrating the milk meter(s) of the milking system may be performed in accordance with any known and existing method or technique. Certain advantageous method and techniques are disclosed in the European Patent No. EP 1 545 191. For instance, the calibration process described in the European Patent No. EP 1 545 191 can advantageously make use of the reference value provided by the aspects and embodiments of the present invention.

The above-described example methods have been described in conjunction with FIG. 6, which is an example embodiment at quarter-level. As will be appreciated when reading this disclosure, embodiments could equally possible be applied at udder level. In an exemplary udder level embodiment, the earlier-mentioned pre-defined threshold value may be at least four kilograms per minute (e.g., 4.0, 4.25, 4.5, 4.75, 5.0, 5.25, 5.5, 5.75, or 6.0 kilograms per minute). Additionally, or alternatively, the earlier-mentioned pre-defined duration may be at least two minutes.

Figure 7:
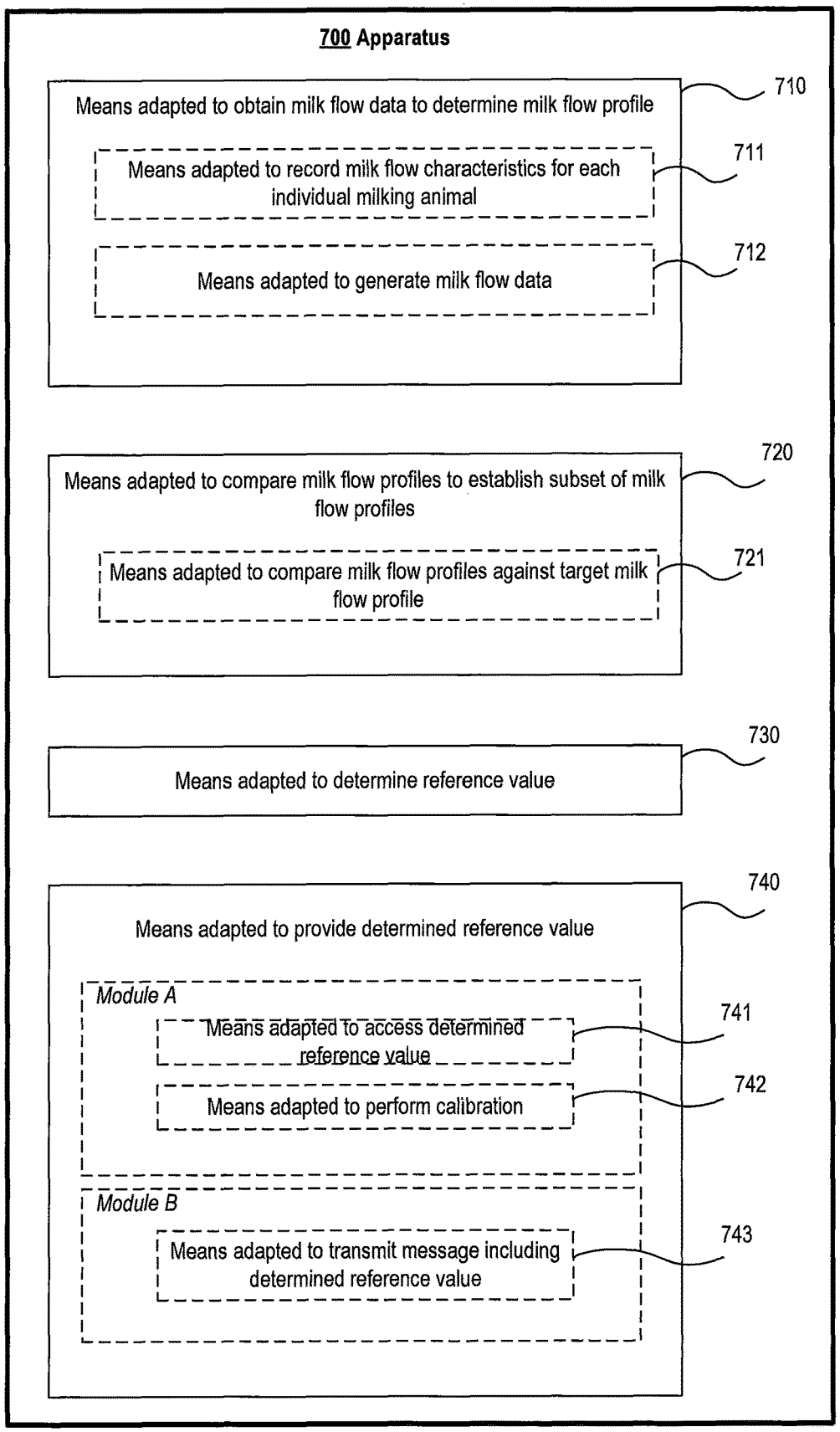
FIG. 7 is a schematic illustration of an example embodiment of an apparatus according to the present invention.

FIG. 7 schematically illustrates an example embodiment of an apparatus 700, which is configured to perform, or otherwise execute, methods as described in conjunction with FIG. 5. The apparatus 700 may comprise means 710 adapted to obtain milk flow data for a plurality of milking animals to determine a milk flow profile for each milking animal of the plurality of milking animals. The apparatus 700 may also comprise means 720 adapted to compare the determined milk flow profiles to establish a subset of milk flow profiles that meets a pre-defined selection criteria. Furthermore, the apparatus 700 may comprise means 730 adapted to determine said reference value based on the established subset of milk flow profiles. Still further, the apparatus 700 may comprise means 740 adapted to provide the determined reference value for controlling a subsequent calibration of at least one milk meter in a milking system.

The pre-defined selection criteria may advantageously include a target milk flow profile, as was previously described with reference to FIG. 5. For example, the target milk flow profile may be a target milk flow rate profile. The target milk flow profile may hence reflect a milking animal having a milk flow above a pre-defined threshold value during a pre-defined duration. In one example embodiment, said pre-defined threshold value is at least one kilogram per minute and said pre-defined duration may be at least two minutes. As can be seen in FIG. 7, the apparatus 700 may hence optionally comprise means 721 adapted to compare determined milk flow profiles against a target milk profile.

With continued reference to FIG. 7, the apparatus 700 may optionally comprise means 711 adapted to record milk flow characteristics for each milking animal of the plurality of milking animals. Additionally, the apparatus 700 may optionally comprise means 712 adapted to generate milk flow data based on the recorded milk flow characteristics.

The apparatus 700 may be adapted to subsequently utilize the determined reference value in a calibration of at least one milk meter in a milking system (cf. Module A in FIG. 7). For example, the apparatus 700 may optionally comprise means 741 adapted to access the determined reference value and means 742 adapted to perform a calibration of at least one milk meter by utilizing the accessed reference value.

Additionally, or alternatively, the apparatus 700 may optionally comprise means adapted to transmit a data message that includes or otherwise indicates the determined reference value to another apparatus, i.e. an apparatus different from the apparatus 700.

Figure 8:
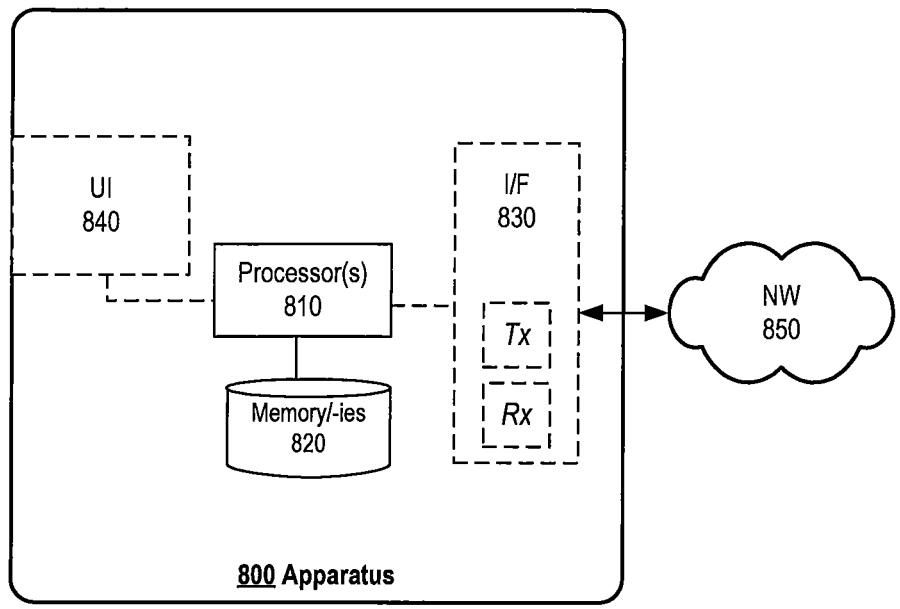
FIG. 8 is a schematic illustration of an example implementation of an apparatus according to the present invention.

Reference is now made to FIG. 8, which schematically illustrates an example implementation of an apparatus which is configured to perform, or otherwise execute, methods as described in conjunction with FIG. 5. As can be seen in FIG. 8, the apparatus 800 may comprise various hardware components 810, 820, 830, 840, sometimes also referred to as hardware resources. As is schematically illustrated in FIG. 8, the apparatus 800 may comprise one or more processors 810 and one or more memories 820. Optionally, a communications interface I/F 830, or a communications circuitry, may also be provided in order to allow the apparatus 800 to communicate with other apparatuses, e.g. via a network 850. The network 850 may for example include the Internet. As will be appreciated, the communications interface 830 may comprise a transmitter (Tx) and/or a receiver (Rx). Alternatively, the communications interface 316C may comprise a transceiver (Tx/Rx) combining both transmission and reception capabilities. The communications interface 830 may further include a radio frequency (RF) interface allowing the apparatus to communicate with other apparatuses (not shown) through a radio frequency band through the use of different radio frequency technologies such as 5G New Radio, LTE (Long Term Evolution), WCDMA (Wideband Code Division Multiple Access), or any other cellular network standardized by the 3rd Generation Partnership Project (3GPP), or any other wireless technology such as Wi-Fi, Bluetooth®, etcetera. Optionally, the apparatus 800 may also comprise a user interface (UI) 840.

The apparatus 800 may be loaded with and thus comprise one or more applications. The applications are sets of instructions (e.g., computer program code) that when executed by the one or more processors 810 controls the operation of the apparatus. To this end, the one or more memories 820 may comprising instructions executable by the one or more processors 810 whereby the apparatus 800 is operative to: obtain milk flow data for a plurality of milking animals to determine a milk flow profile for each milking animal of the plurality of milking animals; compare the determined milk flow profiles to establish a subset of milk flow profiles that meets a pre-defined selection criteria; and determine said reference value based on the established subset of milk flow profiles; and provide the determined reference value for controlling a subsequent calibration of at least one milk meter in a milking system.

As described earlier in conjunction with FIG. 5, said pre-defined selection criteria may include a target milk flow profile, such as a target milk flow rate profile. The target milk flow profile may reflect a milking animal having a milk flow above a pre-defined threshold value during a pre-defined duration.

Again, it is conceivable to apply or otherwise use different criteria for the target milk flow profile may be used in order to establish the subset of milk flow profiles. In one implementation, it is recognized that it may be advantageous to utilize, or otherwise apply, criteria associated with the plateau phase of a target milk flow rate profile (cf. FIG. 6). For example, said pre-defined threshold value may therefore be at least one kilogram per minute. Additionally, said pre-defined duration may be at least two minutes. As will be appreciated, and in accordance with this example embodiment at quarter-level, milk flow rate profiles meeting these criteria (i.e., >1 kg/min for 2 minutes or longer, i.e. during the "plateau" phase) would be selected, or otherwise determined, to represent or form the subset of milk profiles.

In some implementations, the one or more memories 820 may additionally comprise instructions executable by the one or more processors 810 whereby the apparatus 800 is operative to record or otherwise register milk flow characteristics for each milking animal of the plurality of milking animals. Additionally, the one or more memories 820 may optionally comprise instructions executable by the one or more processors 810 whereby the apparatus 800 is operative to generate or otherwise produce milk flow data based on the recorded milk flow characteristics.

In certain implementations, the apparatus 800 may additionally be loaded with and thus comprise one or more applications to be used for controlling the calibration of one or more milk meters in a milking system. If so, the milking system may be a milking system of a type comprising at least one milking station and at least one milk meter. The at least one milking station may accessible by the plurality of milking animals. Furthermore, the at least one milk meter that may be configured to measure at least one value of a parameter that corresponds to a milk flow of a milking animal. The application(s) may hence include sets of instructions (e.g., computer program code) that when executed by the one or more processors 810 controls the operation of a calibration process of one or more milk meters by means of the apparatus 800. To this end, the one or more memories 820 may for example include instructions executable by the one or more processors 810 whereby the apparatus 800 is operative to perform a calibration of at least one milk meter in the milking system and the earlier-described determined reference value is subsequently utilized in this calibration. In some implementations, the one or more memories 820 comprises instructions executable by the one or more processors 810 whereby the apparatus 800 is operative to access the determined reference value; and perform a calibration of at least one milk meter by utilizing the accessed reference value.

Figure 9:
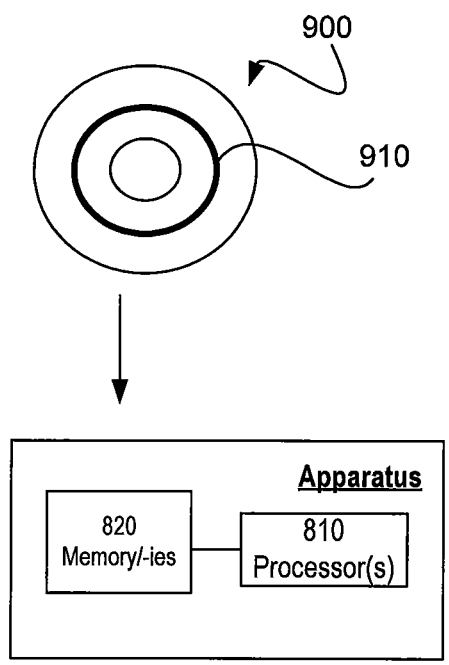
FIG. 9 illustrates a carrier containing a computer program, in accordance with an aspect of the present invention.

Turning now to FIG. 9, another aspect will be briefly discussed. FIG. 9 shows an example of a computer-readable medium, in this example in the form of a data disc 900. In one embodiment the data disc 900 is a magnetic data storage disc. The data disc 900 is configured to carry instructions 910 that can be loaded into a memory 820 of an apparatus, such as the apparatus 800 illustrated in FIG. 8. Upon execution of said instructions by a processor 810 of the apparatus 800, the apparatus 800 is caused to execute a method or procedure according to the methods disclosed in this disclosure, for example in conjunction with FIG. 5. The data disc 900 is arranged to be connected to or within and read by a reading device (not shown), for loading the instructions into the processor 810. One such example of a reading device in combination with one (or several) data disc(s) 900 is a hard drive. It should be noted that the computer-readable medium can also be other mediums such as compact discs, digital video discs, flash memories or other memory technologies commonly used. In such an embodiment the data disc 900 is one type of a tangible computer-readable medium. The instructions may alternatively be downloaded to a computer data reading device, such as a computer or other apparatus 800 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 810 of the apparatus 800. In such an embodiment, the computer-readable signal is one type of a non-tangible computer-readable medium.

Reference is now made to FIGS. 1, 2, 3 and 4 again. It should be appreciated that the apparatuses described hitherto (see e.g. FIGS. 7, 8 and 9) may be applied as an apparatus separate and distinct from the components illustrated in FIGS. 1, 2, 3 and/or 4. Alternatively, the functionality of the apparatuses described hitherto (see e.g. FIGS. 7, 8 and 9) may be implemented in already available components such as in the control unit 15, the memory 17 and/or the user interface 18 (cf. FIGS. 1, 2, 3 and 4). The exact choice of implementation should be evaluated and tested in each case depending e.g. on specific milking system requirements and user demands.

Various aspects and embodiments described herein allow for improved calibrations of milk meter(s) of a milking system. While the various aspects and embodiments are not directed towards the calibration per se, this disclosure proposes a way of providing reference value(s) to be used in the calibration of milk meter(s) with improved accuracy and/or increased reliability. For example, in some aspects and embodiments only "high-performing" milking animals represent the subset from which the reference value is established.

By allowing for improved accuracy and/or increased reliability in the subsequent calibration process it is also made possible to allow for to better milking performance in that unnecessary underfeeding/overfeeding of milking animals can be avoided or at least reduced.

Another advantage with aspects and embodiments presented throughout this disclosure is that the reference value can be provided in real-time, or substantially in real-time. By providing a real-time solution, it may further be possible to allow for a solution that can rely less on maintenance work to be performed by service technicians.

In the detailed description hereinabove, for purposes of explanation and not limitation, specific details are set forth in order to provide a thorough understanding of various aspects and embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method (500) for providing a reference value to be used for controlling a calibration of at least one milk meter in a milking system, the method comprising:
   obtaining (510) milk flow data for a plurality of milking animals to determine a milk flow profile for each milking animal of the plurality of milking animals;
   comparing (520) the determined milk flow profiles to establish a subset of milk flow profiles, from the determined milk flow profiles, that meets a pre-defined selection criteria;
   determining (530) said reference value based on the established subset of milk flow profiles; and
   providing (540) the determined reference value for controlling a subsequent calibration of the at least one milk meter in the milking system.

2. The method (500) according to claim 1, wherein said pre-defined selection criteria includes a target milk flow profile, wherein the target milk flow profile reflects one milking animal, of the plurality of milking animals, having a milk flow above a pre-defined threshold value during a pre-defined duration.

3. The method according to claim 2, wherein said pre-defined duration corresponds to a pre-defined phase of the target milk flow profile and wherein the pre-defined phase is any one or a combination of the following pre-defined phases: i) an increase phase, ii) a plateau phase, and iii) a decline phase.

4. The method (500) according to claim 2, wherein said pre-defined threshold value is at least one kilogram per minute.

5. The method (500) according to claim 2, wherein said pre-defined duration is at least two minutes.

6. The method (500) according to claim 1, wherein the step of obtaining (510) milk flow data for the plurality of milking animals comprises:
   recording (511) milk flow characteristics for each milking animal of the plurality of milking animals; and
   generating (512) milk flow data based on the recorded milk flow characteristics.

7. The method (500) according to claim 1, comprising the further step of utilizing the determined reference value in the calibration of the at least one milk meter in the milking system.

8. The method (500) according to claim 7, wherein the method further comprises:
   accessing (541) the determined reference value; and
   performing (542) the calibration of the at least one milk meter by utilizing the accessed determined reference value.

9. The method (500) according to claim 7, wherein the method is performed in the milking system which comprises:
   at least one milking station accessible by the plurality of milking animals; and
   at least one milk meter that is configured to measure at least one value of a parameter that corresponds to a milk flow of a milking animal.

10. An apparatus (700; 800) for providing a reference value to be used for controlling a calibration of at least one milk meter in a milking system, the apparatus (700; 800) comprising:
    at least one processor (710, 720, 730, 740; 810); and
    at least one memory (710, 720, 730, 740; 820) comprising instructions executable by the at least one processor (710, 720, 730, 740; 810) whereby by executing the instructions the apparatus (700; 800) is operative to:
    obtain milk flow data for a plurality of milking animals to determine a milk flow profile for each milking animal of the plurality of milking animals;
    compare the determined milk flow profiles to establish a subset of milk flow profiles that meets a pre-defined selection criteria;
    determine said reference value based on the established subset of milk flow profiles; and
    provide the determined reference value for controlling a subsequent calibration of the at least one milk meter in the milking system.

11. The apparatus (700; 800) according to claim 10, wherein said pre-defined selection criteria includes a target milk flow profile, wherein the target milk flow profile reflects one milking animal of the plurality of milking animals having a milk flow above a pre-defined threshold value during a pre-defined duration.

12. The apparatus (700; 800) according to claim 11, wherein said pre-defined duration corresponds to a pre-defined phase of the target milk flow profile and wherein the pre-defined phase is any one or a combination of the following pre-defined phases: i) an increase phase, ii) a plateau phase, and iii) a decline phase.

13. The apparatus (700; 800) according to claim 11, wherein said pre-defined threshold value is at least one kilogram per minute.

14. The apparatus (700; 800) according to claim 11, wherein said pre-defined duration is at least two minutes.

15. The apparatus (700; 800) according claim 10, wherein the at least one memory (710, 720, 730, 740; 820) further comprises additional instructions executable by the at least one processor (710, 720, 730, 740; 810) whereby by executing the additional instructions the apparatus (700; 800) is operative to:
    record milk flow characteristics for each milking animal of the plurality of milking animals; and
    generate milk flow data based on the recorded milk flow characteristics.

16. The apparatus (700; 800) according to claim 10, wherein the apparatus (700; 800) is further configured to utilize the determined reference value to perform the calibration of the at least one milk meter in the milking system.

17. The apparatus (700; 800) according to claim 16, wherein the at least one memory (710, 720, 730, 740; 820) further comprises additional instructions executable by the at least one processor (710, 720, 730, 740; 810) whereby by executing the additional instructions the apparatus (700; 800) is operative to:
    access the determined reference value; and
    perform the calibration of the at least one milk meter by utilizing the accessed reference value.

18. The apparatus (700; 800) according to claim 16, wherein the milking system comprises:

at least one milking station (10*a*, 10*b*; 20; 30) accessible by the plurality of milking animals; and at least one milk meter (14*a*, 14*b*; 21*a-d*; 31; 41*a-b*, 42*a-b*) that is configured to measure at least one value of a parameter that corresponds to a milk flow of one milking animal of the plurality of milking animals.

19. A non-transitory computer-readable storage medium comprising instructions (910) which, when executed on at least one processor (810), cause the at least one processor (810) to carry out a method (500) for providing a reference value to be used for controlling a calibration of at least one milk meter in a milking system, the method comprising:

obtaining (510) milk flow data for a plurality of milking animals to determine a milk flow profile for each milking animal of the plurality of milking animals;

comparing (520) the determined milk flow profiles to establish, from the determined milk flow profiles, a subset of milk flow profiles that meets a pre-defined selection criteria;

determining (530) said reference value based on the established subset of milk flow profiles; and providing (540) the determined reference value for controlling a subsequent calibration of the at least one milk meter in the milking system.

20. The non-transitory computer-readable storage medium comprising additional instructions which, when executed on at least one processor (810), cause the at least one processor (810) to utilize the determined reference value in the calibration of the at least one milk meter in the milking system.

\* \* \* \* \*